United States Patent
Pollack et al.

(10) Patent No.: US 6,486,776 B1
(45) Date of Patent: Nov. 26, 2002

(54) RF TRANSPONDER AND METHOD OF MEASURING PARAMETERS ASSOCIATED WITH A MONITORED OBJECT

(75) Inventors: Richard Stephen Pollack, Boulder, CO (US); Donald Lee Black, Erie, CO (US); Dale Lee Yones, Boulder, CO (US); Robert Walter Brown, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/622,555

(22) PCT Filed: Apr. 14, 1998

(86) PCT No.: PCT/US98/07338

§ 371 (c)(1),
(2), (4) Date: Aug. 17, 2000

(87) PCT Pub. No.: WO99/52723

PCT Pub. Date: Oct. 21, 1999

(51) Int. Cl.⁷ .............................................. G08B 19/00
(52) U.S. Cl. .................. 340/521; 340/539; 340/442; 340/445; 340/447; 73/146.2
(58) Field of Search .................. 340/517, 521, 340/539, 442, 438, 445, 447; 73/146.5

(56) References Cited

U.S. PATENT DOCUMENTS

| | | | | |
|---|---|---|---|---|
| 5,218,861 A | * | 6/1993 | Brown et al. | 73/146.5 |
| 5,483,827 A | * | 1/1996 | Kulka et al. | 73/146.5 |
| 5,541,574 A | * | 7/1996 | Lowe et al. | 340/447 |
| 5,731,754 A | * | 3/1998 | Lee et al. | 340/447 |
| 5,764,138 A | * | 6/1998 | Lowe | 340/447 |
| 5,883,305 A | * | 3/1999 | Jo et al. | 73/146.5 |
| 6,087,930 A | * | 7/2000 | Kulka et al. | 340/447 |
| 6,339,956 B1 | * | 1/2002 | Huinink et al. | 73/146 |
| 6,362,731 B1 | * | 3/2002 | Lill | 340/445 |
| 6,412,977 B1 | * | 7/2002 | Black et al. | 374/178 |

* cited by examiner

Primary Examiner—Daryl Pope
(74) Attorney, Agent, or Firm—Howard M. Cohn

(57) ABSTRACT

A radio frequency (RF) transponder (200) capable of measuring parameters associated with an object and transmitting data to an external reader/interrogator (106, 400). In use with a pneumatic tire (104), the transponder measures temperature and pressure within the tire. The transponder includes circuitry (226) for controlling windows of time ($W_T$ and $W_P$) during which real-time temperature and pressure measurements are made, and for storing (236) calibration data, transponder ID number and the like, and for transmitting this information in a data stream (FIG. 3C) to the reader/interrogator. An excessive temperature condition may also be sensed (MTMS 218) and included in the data stream. The circuitry of the transponder is preferably implemented on a single IC chip (204), using CMOS technology, with few components external to the IC chip. The transponder is preferably passive, deriving its operating power from an RF signal provided by the exernal reader/interrogator. Data ($N_T$) indicative of temperature and data ($N_P$) indicative of pressure are both transmitted to the reader/interrogator, along with calibration data. A calibration data stored by the transponder and transmitted in the data stream is a slope of $N_T/N_P$, or the "ratioed" response of the temperature count divided by the pressure count, which is determined during calibration of the transponder.

20 Claims, 5 Drawing Sheets

Figure 3A
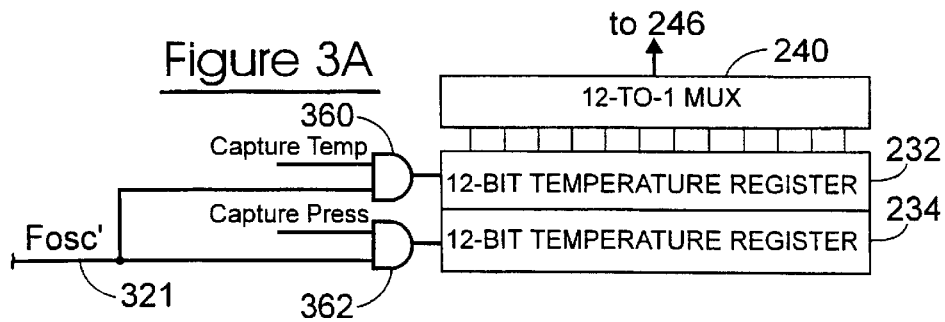
Figure 3B
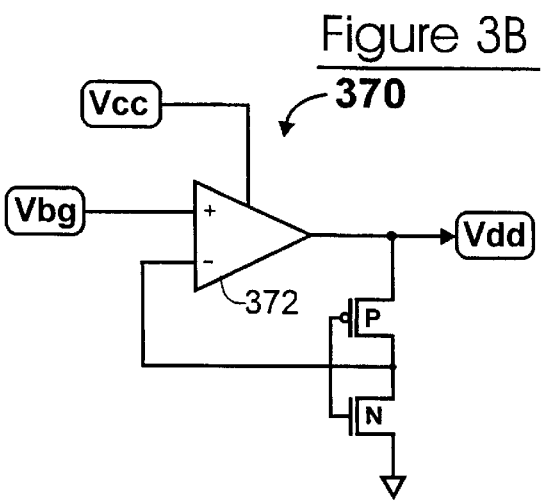
Figure 3C
←—12 COLUMNS—→
| ROW 1 | SYNC 000..011 |
|---|---|
| ROW 2 | DATA 012..023 |
| ROW 3 | DATA 024..035 |
| ROW 4 | DATA 036..047 |
| ROW 5 | DATA 048..059 |
| ROW 6 | DATA 060..071 |
| ROW 7 | DATA 072..082, MTMS 083 |
| ROW 8 | TEMP COMP 084..095 |
| ROW 9 | PRESS COMP 096..107 |
| ROW 10 | TEMP/PRESS SLOPES 108..113, 114..119 |
| ROW 11 | TEMP COUNT (NT) 120..131 |
| ROW 12 | PRESS COUNT (NP) 132..143 |

RF TRANSPONDER AND METHOD OF MEASURING PARAMETERS ASSOCIATED WITH A MONITORED OBJECT

TECHNICAL FIELD OF THE INVENTION

The present invention relates to transponders, with emphasis on "passive" transponders which derive their operating power from an external radio frequency (RF) source, and more particularly to transponders associated with a pneumatic tire for use in tire identification and transmission of pressure and/or temperature data.

BACKGROUND OF THE INVENTION

Transponder or transceiver type identification systems are well known, and generally are capable of receiving an incoming interrogation signal and responding thereto by generating and transmitting an outgoing responsive signal. The outgoing responsive signal, in turn, is modulated or otherwise encoded so as to uniquely identify or label the particular object to which the transponder element is affixed. An example of such a transponder type identification system is disclosed in U.S. Pat. No. 4,857,893, issued Aug. 15, 1989 to Carroll and incorporated in its entirety herein. This patent describes a transponder device which receives a carrier signal from an interrogator unit. This carrier signal, of frequency F, is rectified by a rectifying circuit in order to generate operating power. Alternatively, the addition of a hybrid battery allows device to be converted into a self-powered beacon device. Logic/timing circuits derive a clock signal and second carrier signal of frequency F/n from the received carrier signal. A uniquely-identifying data word is stored in a Programmable Read-Only Memory (PROM). The data word is encoded and mixed with the carrier signal in a balanced modulator circuit, the output of which is transmitted to the interrogator unit where it is decoded and used as an identifying signal. All electrical circuits of the transponder device are realized on the same monolithic semiconductor chip which may be implemented as a Complementary Metal Oxide Semiconductor (CMOS) device.

In the manufacture of pneumatic tires, it is desirable to uniquely identify each tire as soon as possible during the course of its fabrication. This is generally done by assigning an identification (ID) number to each tire. The ability to uniquely identify tires throughout their manufacture is particularly valuable in quality control in order that the source of manufacturing problems can readily be ascertained. For example, statistical process control and other methods can be used with tire identification to detect process parameters that are going out of specification to detect machinery wear, failure, or maladjustment. The identification information should be easily discernible throughout the manufacturing process, including throughout post-manufacturing (e.g., inventory control) stages.

It is also beneficial to be able to uniquely identify a tire throughout its service life (use), for example for warranty determination, and retreading of the tire should not adversely affect the ability to identify the tire. It is also important that the tire identification be readily discernible when the tire is mounted on a steel or aluminum rim (as is normally the case), including when the rim is one of a pair of rims in a dual wheel assembly (as is common with tractor trailers).

Aside from being able to uniquely identify a tire at various stages in its manufacture and service life, it is beneficial to be able to monitor tire pressure when the tire is in use. As is known, proper tire inflation is important to proper tire performance, including road-handling, wear, and the like.

U.S. Pat. No. 4,578,992 issued Apr. 1, 1986 to Galasko, et al. and incorporated in its entirety herein, discloses a tire pressure indicating device including a coil and a pressure-sensitive capacitor forming a passive oscillatory circuit having a natural resonant frequency which varies with tire pressure due to changes caused to the capacitance value of the capacitor. The circuit is energized by pulses supplied by a coil positioned outside the tire and secured to the vehicle, and the natural frequency of the passive oscillatory circuit is detected. The natural frequency of the coil/capacitor circuit is indicative of the pressure on the pressure-sensitive capacitor.

U.S. Pat. No. 4,758,969 issued Jul. 19, 1988 to Andre, et al. and incorporated in its entirety herein, discloses a device for measuring brake temperature and tire pressure on sets of wheels. The temperature sensors are located on a fixed part of each wheel, and communicate with the central computer by means of wires. A pressure sensor is mounted on each wheel along with electronic means for frequency coding the pressure data. Between each wheel and the fixed part of each wheel is a coupling element, preferably a rotating transformer for communicating with the central tire pressure measuring system computer. The frequency coding electronics preferably include a voltage/frequency converter to convert a voltage constituting the signal delivered by the sensor into a frequency which is a function of said voltage.

The use of radio frequency (RF) transponders, located either within the tire or on a rim for the tire, in conjunction with electronic circuitry for transmitting a RF signal carrying tire inflation (pressure) data, is also well known.

An example of a RF transponder suitable to be installed in the carcass of a pneumatic vehicle tire is disclosed in PCT International Application Publication No. WO 96/064747 issued Mar. 7, 1996 to Andrew, et al. and incorporated in its entirety herein. This patent describes a tyre condition monitoring system with a battery-powered ("active") transmitter unit in each vehicle wheel for sensing temperature, pressure and rotation of the wheel. A common problem to be dealt with in such active systems is the life of the battery (power supply). The transmitter unit is arranged so that power is only applied during the sensing and transmission of data, and intervals between transmissions of data can be varied depending on whether rotation of the wheel has been sensed. The transmitter unit (RF transponder) includes a pressure sensor (either piezoresistive or silicon capacitive), a thermistor for temperature sensing and an input for measuring the battery voltage. These sensor measurements are periodically checked, being routed one at a time to an analog-to-digital converter (A/D) by a multiplexer. A microprocessor receives the digitized readings, preferably converts them to temperature and pressure units, and periodically transmits them. The microprocessor has RAM, ROM and inputs including the A/D, a clock, a timer, and centrifugal detector. It controls overall operation of the transmitter unit. An identification number (ID) is stored in non-volatile ROM memory, and calibration constants for data conversion are stored in battery-maintained RAM. In normal operating mode, the RF transmission, when required, includes the ID, the temperature reading, and the pressure reading. The number values in the transmission string are digitized and encoded for error correction using Manchester coding. The calibration constants are preferably used to convert the readings from voltages to suitable temperature and pressure units, but may alternatively be stored in the vehicle receiving unit and used therein to convert transmitted voltage readings. In order to minimize battery use by minimizing transmission times, the calibration constants are only transmitted on demand from the receiving unit, preferably upon tire installation. The calibration constants include one constant to convert temperature sensor voltage to degrees, and two constants to convert pressure sensor voltage to pressure units and also correct for the pressure sensor's temperature coefficient.

An example of a RF transponder suitable to be installed in the carcass of a pneumatic vehicle tire is disclosed in U.S. Pat. No. 5,451,959 issued Sep. 19, 1995 to Schuermann and incorporated in its entirety herein. This patent describes a transponder system comprising an interrogation unit for communicating with a plurality of responder units. The responder unit contains a parallel resonant circuit having a coil and a capacitor for reception of a RF interrogation pulse. Connected to the parallel resonant circuit is a capacitor serving as an energy accumulator. A processor may be provided for receiving input signals from a sensor which responds to physical parameters in the environment of the responder unit 12, for example to the ambient temperature, the ambient pressure or the like. The sensor could for example be an air-pressure sensitive sensor. In this case the responder unit can be installed in the carcass of a vehicle pneumatic tire and, with the aid of an interrogation unit contained in the vehicle, it is possible to continuously monitor the air pressure in the tire.

Another example of a RF transponder suitable to be installed in the a pneumatic vehicle tire is disclosed in U.S. Pat. No. 5,581,023 issued Dec. 3, 1996 to Handfield, et al., and incorporated in its entirety herein. This patent describes a transponder and a receiving unit, preferably one transponder for each vehicle tire, and the transponder may be entirely disposed within the vehicle tire. The transponder includes a pressure sensor, and may include various other sensors such as a temperature sensor. An Application-Specific Integrated Circuit (ASIC) embodiment of the transponder is described. With reference to FIG. 9 of the patent, the ASIC (300) includes an oscillator (322) controlled by an external crystal (325), a constant current device (310) providing current flowing through an external variable-resistance pressure sensor (327), a window comparator circuit (324) having a lower threshold for reporting pressure information established by external resistors (329 and 331) connected in a voltage-divider arrangement, and an upper threshold controlled by an external variable resistor (333). A number of three-position jumpers (328) are utilized to program a unique transponder unit serial number during its manufacture. The ASIC (300) is powered by an external battery (318), and a transmitting circuit (312) is external to the ASIC (300).

Another example of a RF transponder suitable to be installed in a pneumatic vehicle tire is disclosed in U.S. Pat. No. 5,661,651 issued Aug. 26, 1997 to Geschke, et al. and incorporated in its entirety herein. This patent describes a wireless system for monitoring vehicle parameters, such as tire pressure. RF signals transmitted from different tires may be distinguished based upon the frequency of the transmitted signal. In order to sense the pressure inside a tire, tire pressure monitoring systems utilize a pressure sensor located within the tire. FIG. 2 of this patent shows the preferred structure for a parameter sensor and transmitter circuit when used to monitor the pressure inside a vehicle's tire. Parameter sensor and transmitter circuit (20) includes a pressure-to-voltage transducer (21) and a battery-powered power supply circuit (24).

The need to monitor tire pressure when the tire is in use is highlighted in the context of "run-flat" (run deflated) tires, tires which are capable of being used in a completely deflated condition. Such run-flat tires may incorporate reinforced sidewalls, mechanisms for securing the tire bead to the rim, and a non-pneumatic tire (donut) within the pneumatic tire to enable a driver to maintain control over the vehicle after a catastrophic pressure loss, and are evolving to the point where it is becoming less and less noticeable to the driver that the tire has become deflated. The broad purpose behind using run-flat tires is to enable a driver of a vehicle to continue driving on a deflated pneumatic tire for a limited distance (e.g., 50 miles, or 80 kilometers) prior to getting the tire repaired, rather than stopping on the side of the road to repair the deflated tire. Hence, it is generally desirable to provide a low-pressure warning system within in the vehicle to alert (e.g., via a light on the dashboard, or a buzzer) the driver to the loss of air in a pneumatic tire. Such warning systems are known, and do not form part of the present invention, per se.

Although the use of pressure transducers in pneumatic tires, in association with electronic circuitry for transmitting pressure data is generally well known, these pressure-data systems for tires have been plagued by difficulties inherent in the tire environment. Such difficulties include effectively and reliably coupling RF signals into and out of the tire, the rugged use the tire and electronic components are subjected to, as well as the possibility of deleterious effects on the tire from incorporation of the pressure transducer and electronics in a tire/wheel system. In the context of "passive" RF transponders which are powered by an external reader/interrogator, another problem is generating predictable and stable voltage levels within the transponder so that the circuitry within the transponder can perform to its design specification.

An example of a pneumatic tire having an integrated circuit (IC) transponder and pressure transducer is disclosed in commonly-owned U.S. Pat. No. 5,218,861, issued Jun. 15, 1993 to Brown, et. al. and incorporated in its entirety by reference herein. This patent describes an RF transponder mounted within a pneumatic tire. Upon interrogation mounted transponder include:

(a) piezoelectric transducers;

(b) piezoresistive devices, such as one of those disclosed in U.S. Pat. No. 3,893,228 issued in 1975 to George, et al., and in U.S. Pat. No. 4,317,216 issued in 1982 to Gragg, Jr.;

(c) silicon capacitive pressure transducers, such as is disclosed in U.S. Pat. No. 4,701,826 issued in 1987 to Mikkor;

(d) devices formed of a variable-conductive laminate of conductance ink; and (e) devices formed of a variable-conductance elastomeric composition.

BRIEF SUMMARY OF THE INVENTION

It is a broad object of the present invention to provide an improved radio frequency (RF) transponder ("tag") as defined in one or more of the appended claims and, as such, having the capability of being constructed to accomplish one or more of the following subsidiary objects.

It is a further object of the invention to provide an improved radio frequency (RF) transponder ("tag") capable of transmitting data related to a monitored object and parameters associated with the object to an external reader/ interrogator. It is another object of the present invention to provide pressure data from a transponder to an external reader/interrogator in a manner in which temperature-dependency of the pressure data can be eliminated from the pressure data, resulting in a temperature-compensated pressure measurement being displayed by the external reader/interrogator.

According to the invention, a radio-frequency (RF) transponder comprises circuitry capable of transmitting information unique to an object with which the transponder is associated to an external reader/interrogator. Additionally, one or more sensors (transducers) provide real-time parameter measurement at the transducer location. These measurements are transmitted to the external reader/interrogator, in the form of data, in a data stream on a signal which is output by the transponder, such as by impressing (modulating) the data stream onto a RF signal transmitted by the transponder to the external reader/interrogator.

According to an aspect of the invention, the transponder is preferably powered by an RF signal from the external reader/interrogator. However, it is within the scope of this invention that the transponder is battery-powered.

According to an aspect of the invention, the transponder is preferably implemented on a single integrated circuit (IC) chip, with a minimum of external instrumentalities such as an antenna.

According to an aspect of the invention, at least one real-time parameter which is measured is temperature. Preferably, the temperature sensor is embedded ("on-chip") in the IC chip of the transponder.

According to an aspect of the invention, an additional real-time parameter which may be measured is pressure. Pressure is preferably measured by a separate ("off-chip") pressure sensor, which is preferably of a type that varies its capacitance value as a function of ambient pressure. Preferably, the temperature sensor is disposed so as to be subject to substantially the same ambient temperature as the pressure sensor so that a true, temperature-compensated pressure can readily be calculated.

According to an aspect of the invention, another additional parameter which may be measured is in the form of an indication that an excessively high temperature condition, albeit transient, has previously occurred. It should be understood that this parameter is different in nature than the real-time parameters of temperature and pressure. An example of a sensor suitable for sensing and indicating that such a transient over-temperature condition has occurred can be found in U.S. Pat. No. 5,712,609, issued Jan. 27, 1998 to Mehregany, et al. and incorporated by reference in its entirety herein. Mehregany's sensor is cited as being exemplary of a suitable Maximum Temperature Measurement (polling) by an external RF signal provided by a "reader", the transponder transmits tire identification and tire pressure data in digitally-coded form. The transponder is "passive" in that it is not self-powered, but rather obtains its operating power from the externally-provided RF signal. The tire has two spaced beads, each including an annular tensile member of wound or cabled steel wire. The transponder antenna is positioned adjacent one of the annular tensile members for electric or magnetic field coupling to the annular tensile member.

Another example of a pneumatic tire having an integrated circuit (IC) transponder and pressure transducer is disclosed in commonly-owned U.S. Pat. No. 5,181,975, issued Jan. 26, 1993 to Pollack, et. al. and incorporated in its entirety by reference herein. As described in this patent, in a tire that has already been manufactured, the transponder may be attached to an inner surface of the tire by means of a tire patch or other similar material or device.

Another example of an RF transponder in a pneumatic tire is disclosed in commonly-owned U.S. Pat. No. 4,911,217, issued Mar. 27, 1990 to Dunn, et. al. and incorporated in its entirety by reference herein. This patent describes the transponder having two electrodes, a first of which is positioned such that the average spacing of the first electrode's surface from one of the tire's steel reinforcing components, such as an annular tensile member in its bead or a steel-reinforced ply, is substantially less than the average spacing of the second electrode's surface from the reinforcing component. FIG. 1a of this patent also describes a prior art identification system ("reader") that can be used to interrogate and power the transponder within the tire. The identification system includes a portable hand-held module having within it an exciter and associated circuitry for indicating to a user the numerical identification of the tire/transponder in response to an interrogation signal.

Typically, in an IC transponder, the IC chip and other components are mounted and/or connected to a substrate such as a printed circuit board (PCB). For example, a pressure transducer may be mounted to the PCB and wired either directly to the IC chip or indirectly to the IC chip via conductive traces on the PCB. The PCB substrate is suitably a reinforced epoxy laminate having a thickness of twenty mils, and having a glass transition temperature exceeding 175° C. (degrees Celsius). A suitable PCB material is available as "high performance" FR-4 epoxy laminate, grade 65M90, sold by Westinghouse Electric Corporation, Copper Laminates Division, 12840 Bradley Avenue, Sylmar, Calif. 91342.

There have thus been described, hereinabove, a number of RF transponders suitable for mounting within a pneumatic tire. The environment within which a tire-mounted transponder must reliably operate, including during manufacture and in use, presents numerous challenges to the successful operation of the transducer. For example, the pressure sensor used with the transponder preferably will have an operating temperature range of up to 125° C., and should be able to withstand a manufacturing temperature of approximately 177° C. For truck tire applications, the pressure sensor must have an operating pressure range of from about 50 psi (pounds per square inch) to about 120 Psi (from about 345 kp (kilopascals) to about 827 kD), and should be able to withstand pressure during manufacture of the tire of up to about 400 psi (about 2758 kp). The accuracy, including the sum of all contributors to its inaccuracy, should be on the order of plus or minus 3% of full scale. Repeatability and stability of the pressure signal should fall within a specified accuracy range.

The transponder must therefore be able to operate reliably despite a wide range of pressures and temperatures. Additionally, a tire-mounted transponder must be able to withstand significant mechanical shocks such as may be encountered when a vehicle drives over a speed bump or a pothole.

Suitable pressure transducers for use with a tire-Switch (MTMS) for use with the transponder of the present invention. Reference is also made to U.S. Pat. No. 5,706,565 which is incorporated in its entirety by reference herein.

The transponder is primarily intended to be associated with a pneumatic tire, and is preferably located within the tire. However, it is within the scope of this invention that the transponder is associated with another object being monitored, such as an animal.

In a preferred embodiment, the transponder comprises:

circuitry for receiving an RF signal at a first frequency (Fi) from the external reader/interrogator and processing the received RF signal to provide power and clock pulses to other circuitry;

circuitry for controlling window(s) of time during which real-time parameter measurement(s) is (are) made, and captured;

circuitry for storing calibration constants; and circuitry for impressing (preferably by Phase Shift Keying (PSK) modulation) the captured real-time parameter measurements and excessive temperature condition indication onto a signal which is transmitted back to the external reader/interrogator at a second frequency (Fc) which is different from the first frequency (Fi).

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199b, 199c, etc.

The cross-sectional views presented herein may be in the form of "slices", or "near-sighted" cross-sectional views, omitting certain background lines which would otherwise be visible in a true cross-sectional view, for illustrative clarity.

Figure 1:
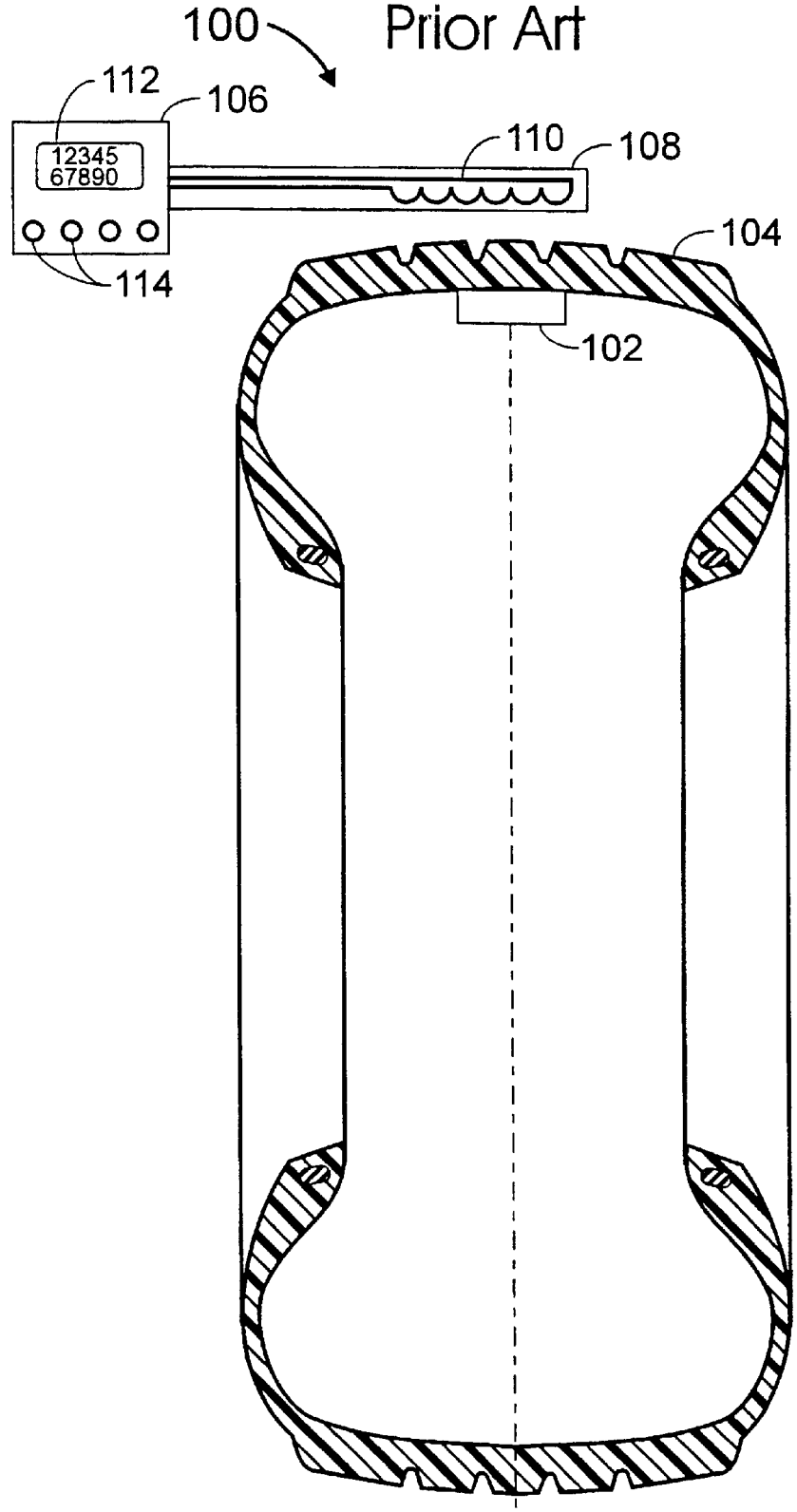
Figure 2:
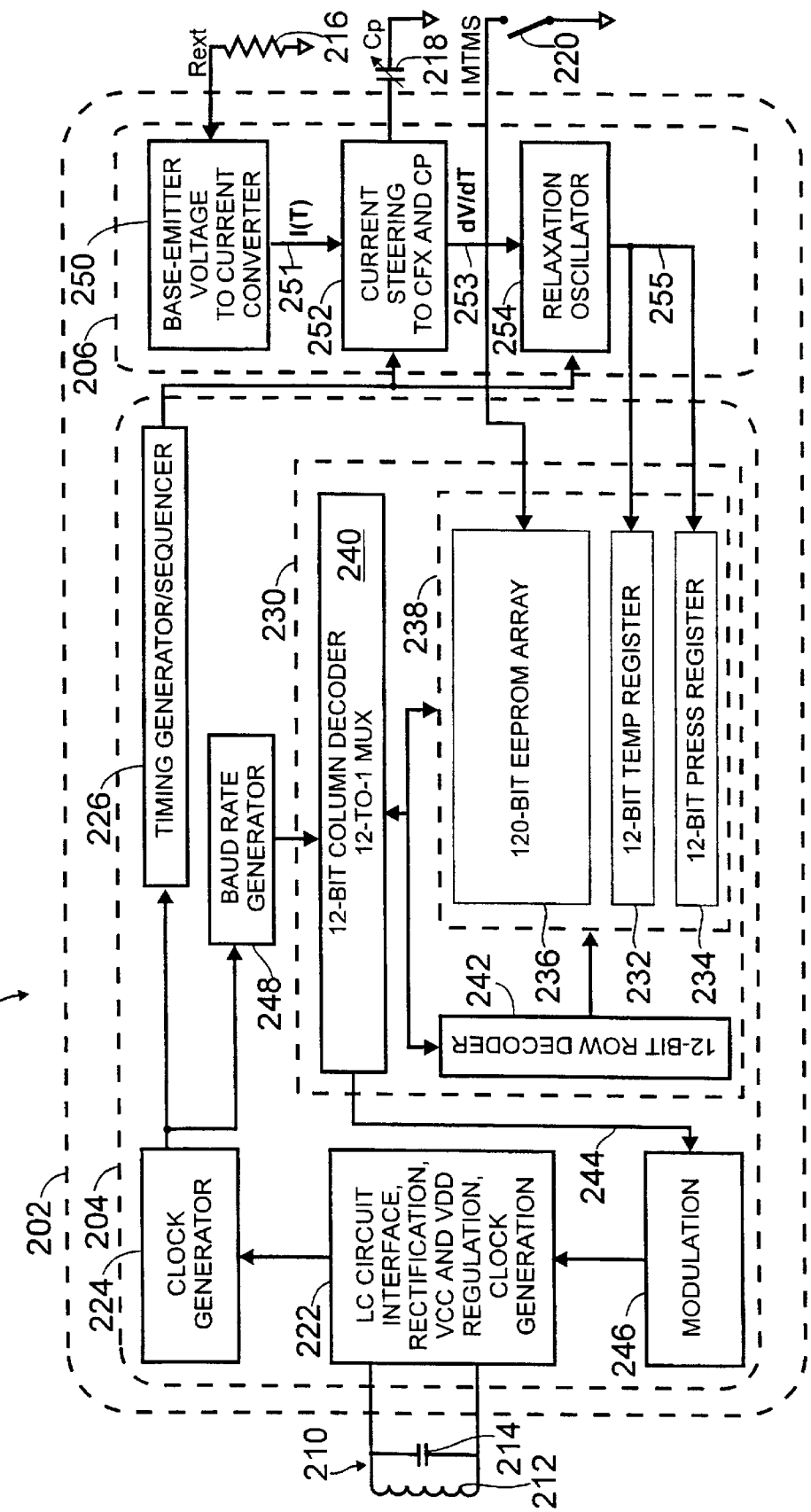
Figure 3:
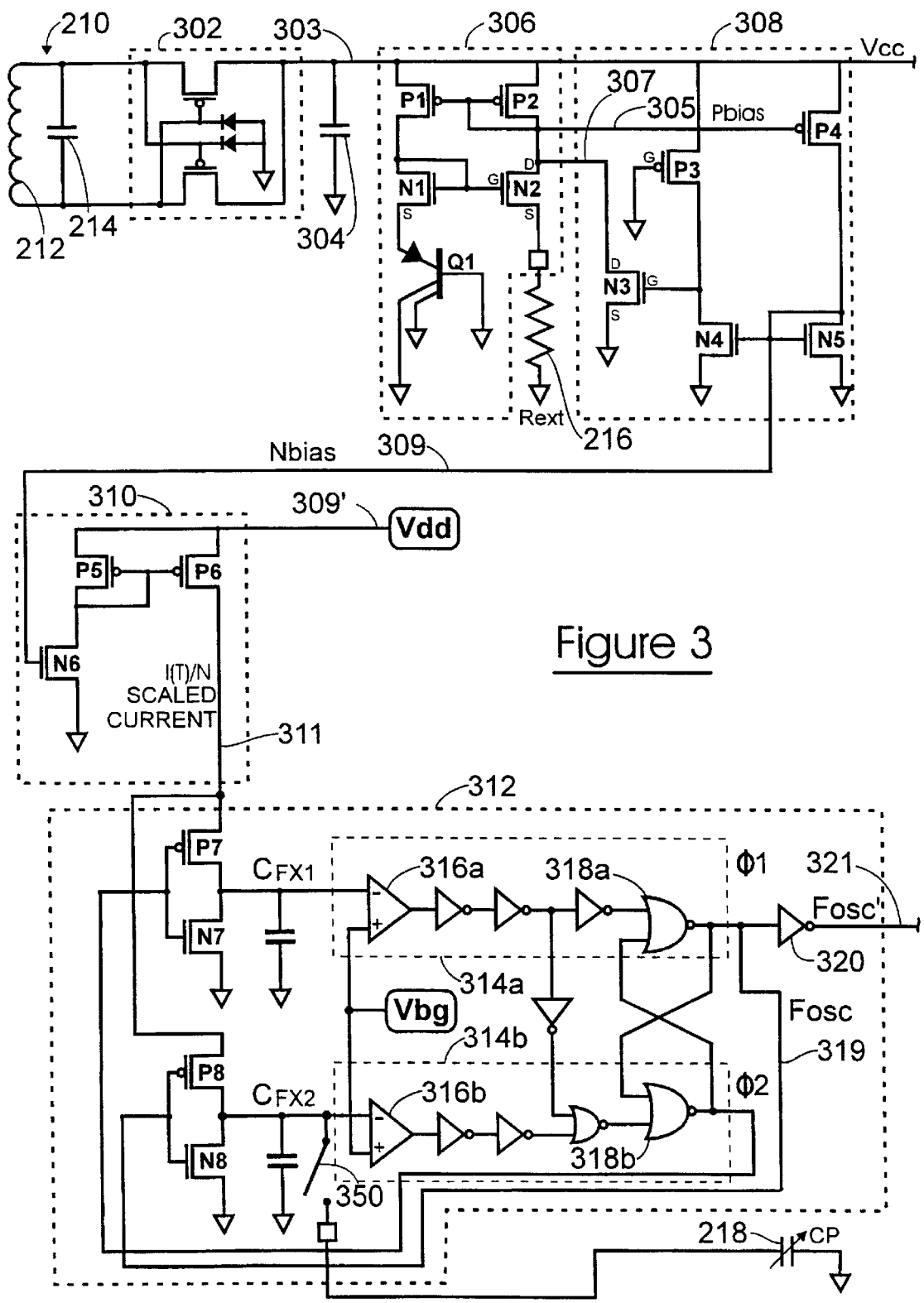
Figure 4:
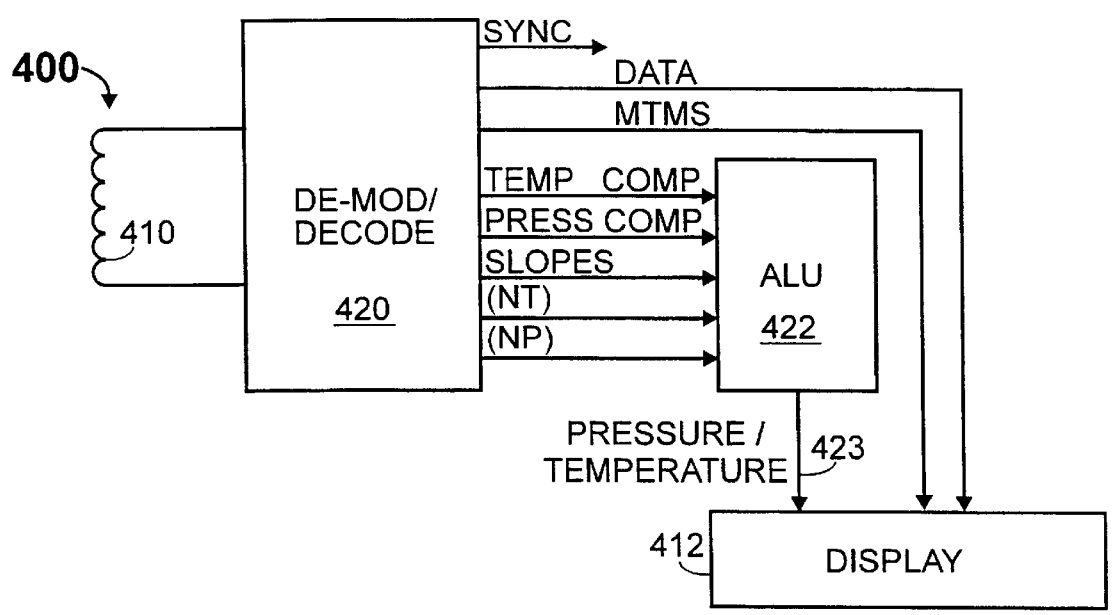

The structure, operation, and advantages of the present preferred embodiment of the invention will become further apparent upon consideration of the following description taken in conjunction with the accompanying drawings, wherein:

FIG. 1 is a generalized block diagram of a RF transponder system comprising an external reader/interrogator and a RF transponder within a pneumatic tire, according to the prior art;

FIG. 2 is a block diagram of major components of a RF transponder, according to the present invention;

FIG. 3 is a schematic diagram of major portions of the RF transponder of FIG. 2, according to the present invention;

FIG. 3A is a schematic diagram of a portion of the RF transponder of FIG. 2, according to the invention;

FIG. 3B is a schematic diagram of a portion of the RF transponder of FIG. 2, according to the invention;

FIG. 3C is a diagram of a memory space within the RF transponder of FIG. 2, illustrating how data may be arranged and transmitted, according to the invention; and FIG. 4 is a schematic block diagram of a receiving portion of a reader/interrogator, according to the invention.

DETAILED DESCRIPTION OF THE INVENTION

FIG. 1 illustrates a RF transponder system 100 of the prior art, comprising a RF (radio frequency) transponder 102 S disposed within (e.g., mounted to an inner surface of) a pneumatic tire 104, An antenna, not shown, is mounted within the tire 104 and is connected to the transponder 102. The transponder 102 is an electronic device, capable of transmitting an RF signal comprising unique identification (ID) information (e.g., its own serial number, or an identifying number of the object with which it is associated in this example, the tire 104) as well as data indicative of a parameter measurement such as ambient pressure sensed by a sensor (not shown) associated with the transponder 102 to an external reader/ interrogator 106. The external reader/interrogator 106 provides an RF signal for interrogating the transponder 102, and includes a wand 108 having an antenna 110, a display panel 112 for displaying information transmitted by from the transponder 102, and controls (switches, buttons, knobs, etc.) 114 for a user to manipulate the functions of the reader/ interrogator 106. The present invention is directed primarily to implementing the RF transponder. Nevertheless, certain functionality for a reader/interrogator to be compatible with the transponder of the present invention is discussed hereinbelow with respect to FIG. 4.

As is known, the ID and/or parameter measurement information may be encoded (impressed) in a variety of ways on the signal transmitted by the transponder 102 to the reader/interrogator 106, and subsequently "de-coded" (retrieved) in the reader/interrogator 106 for display to the user. The RF transponder 102 may be "passive", in that it is powered by an RF signal generated by the external reader/interrogator 106 and emitted by the antenna 108. Alternatively, the RF transponder may be "active", in that it is battery-powered. Transponder systems such as the transponder system 100 described herein are well known.

FIG. 2 is a block diagram of the RF transponder 200 (compare 102) of the present invention, illustrating the major functional components thereof.

The transponder 200 is preferably implemented on a single integrated circuit (IC) chip shown within the dashed line 202, to which are connected a number of external components. Other dashed lines in the figure indicate major functional "blocks" of the transponder 200, and include a transponder "core" 204 and a sensor interface 206. The components external to the IC chip 202 include an antenna system 210 comprising an antenna 212 and a capacitor 214 connected across the coil 212 to form an L-C resonant tank circuit, an external precision resistor ("Rext") 216, an external pressure-sensing capacitor ("$C_P$") 218, and an optional external maximum temperature measurement switch ("MTMS") 220. The antenna may be in the form of a coil antenna, a loop antenna, a dipole antenna, and the like. Alternatively, the signal output by the transponder may be provided on a transmission line. In the main hereinafter, a transponder having a coil antenna is described.

The transponder core 204 includes interface circuitry 222 for processing an RF signal, such as a 125 kHz (kilohertz) un-modulated carrier signal received by the antenna 212, for rectifying the received RF signal, and for providing voltages for powering other circuits on the IC chip 202. For example, the interface circuitry provides a regulated supply voltage (Vdd) of 2.5 volts, and a temperature-independent bandgap voltage (Vbg) of 1.32 volts. The provision of various supply and reference voltages for the transponder circuitry are described in greater detail hereinbelow, with reference to FIG. 3B. The interface circuitry 222 also provides the received RF signal, preferably at the frequency (Fi) it is received, to a clock generator circuit 224 which generates clock signals in a known manner for controlling the timing of other circuits on the IC chip 202 as well as the frequency (Fc) of a signal which is transmitted by the transponder to the external reader/interrogator.

A timing generator/sequencer circuit 226 receives the clock pulses from the clock generator circuit 224 and processes (e.g., divides) the clock pulses to generate timing windows ($W_T$ and $W_P$, described hereinbelow) for predetermined periods of time during which parameter (e.g., temperature and pressure) measurements are made. The timing windows ($W_T$ and $W_P$) may either be of substantially equal duration or of unequal duration. The timing generator/sequencer circuit 226 also controls the timing and sequence of various functions (e.g., pressure measurement and capture, temperature measurement and capture, described in greater detail hereinbelow) performed in the sensor interface 206, and is preferably implemented as an algorithmic state machine (ASM).

The transponder core 204 further includes a register/counter circuit 230 which includes a temperature register 232 (e.g., 12-bit) and a pressure register 234 (e.g., 12-bit) for capturing and storing temperature and pressure measurements (counts), respectively, and a block 236 of addressable memory, which includes an EEPROM array. The registers 232 and 234 and EEPROM array 236 are shown in a dashed line 238 representing a block of addressable memory on the IC chip.

The register/counter circuit 230 also includes a multiplexer and column decoder 240, as well as a row decoder 242 for controlling the sequence in which signals (i.e., data) are output on a line 244 to a modulation circuit 246 which, via the interface circuitry 222, communicates selected measured tire-operating characteristics in a data stream via the antenna interface 210 to the external reader/interrogator (106, FIG. 1).

The transponder core 204 also includes a baud rate generator 248 which controls the rate at which modulating information (e.g., the temperature or pressure measurement) is applied to the modulation circuit 246. The baud rate generator 248 also provides a data carrier clock controlling the output frequency (Fc) of the transponder and a data rate clock controlling a rate at which the data stream including measurements, calibration information, etc. is modulated onto the transponder output carrier.

The sensor interface 206 includes a circuit 250 for generating an output current I(T) on a line 251 which is related to a predictable characteristic voltage of a temperature-sensitive component (e.g., Vbe of a transistor Q1, described hereinbelow) which is superimposed on the external resistor (Rext) 216. The output current I(T) on the line 251 is provided to a current steering circuit 252 and to a relaxation oscillator 254. In general terms, the relaxation oscillator 254 oscillates at a frequency controlled by a rate of voltage change (dV/dT) produced on an output line 253 from the current steering circuit 252. The rate of voltage change on the line 253 is a function of the output current I(T) on line 251 and of internal capacitances ($C_{FX}$) associated with the relaxation oscillator as well as an external capacitance ($C_P$) that can be switched into the oscillator circuit. An output signal from the relaxation oscillator 254 is provided on a line 255 which, as will be explained in greater detail hereinbelow, is indicative of both ambient temperature and ambient pressure. As used herein, the term "ambient" refers to the parameter being measured in the vicinity of the transponder, more particularly the respective sensors associated with the transponder. When the transponder is mounted within a pneumatic tire, "ambient pressure" refers to the pressure within the tire.

In operation, an RF signal from an external source (i.e., reader/interrogator, not shown, compare 106, FIG. 1) is received by the antenna 212. This RF signal is rectified and used to power the RF transponder 200. Modulating information applied to the modulation circuit 236 is used to alter characteristics of the antenna interface (e.g., impedance, resonant frequency, etc.). These alterations are sensed by the external reader/interrogator and are decoded, providing communication of temperature and pressure information back from the RF transponder 200 to the external reader/interrogator.

The timing generator/sequencer circuit 226 controls whether the current I(T) on the line 251 is "steered" into one or the other of two capacitors ($C_{FX1}$ or $C_{FX2}$, described hereinbelow with respect to the relaxation oscillator 312) associated with the relaxation oscillator 254, and whether the external pressure-sensing capacitance ($C_P$) 218 is or is not included in the generation of an output signal (Fosc) by the relaxation oscillator 254. For example, to measure temperature, the current I(T) is steered into the internal oscillator capacitors ($C_{FX}$), but the pressure-sensing capacitor ($C_P$) is disconnected from (not included in) those capacitances. This means that the frequency of the oscillator output signal seen on line 255 is a function of temperature alone. When the pressure-sensing capacitor ($C_P$) 218 is "switched in", then the output frequency of the oscillator 254 on the line 255 will, as explained in greater detail hereinbelow, be a function of both pressure and temperature. As described in greater detail hereinbelow, an algorithm is employed in the reader/interrogator to generate a temperature-independent measurement of pressure.

As controlled by the timing generator/sequencer circuit 226, either the 12-bit temperature register 232 or the 12-bit pressure register 234 (depending upon whether temperature or pressure is being measured) counts (captures) oscillations of the oscillator output signal on line 255. (Counters, not shown, are associated with these "registers.) The timing "window" provided by the timing generator/sequencer circuit 226 has a known, controlled duration. As a result, the count remaining in (captured by) the respective temperature or pressure counter (register) when the timing window "closes" is a function of (proportional to) the oscillation frequency (Fosc) of the relaxation oscillator 254, and therefore a function of temperature or pressure, whichever is being measured.

The EEPROM array 236 is used to hold calibration constants that the reader system uses to convert temperature and pressure counts ($N_T$ and $N_P$, respectively, described in greater detail hereinbelow) into temperature and pressure readings which can be displayed (e.g., via display 112) to a user. The EEPROM array 236 can also store the ID of the transponder, calibration data for the transponder, and other data particular to the given transponder.

FIG. 3 is a more-detailed schematic diagram 300 of several of the components of the transponder 200 of FIG. 2, primarily those components described hereinabove with respect to the sensor interface section 206 of FIG. 2.

In this schematic diagram 300, conventional circuit symbols are employed. For example, lines which cross over one another are not connected to one another, unless there is a "dot" at their junction (cross-over), in which case the lines are connected with one another. Conventional symbols are employed for transistors, diodes, ground connections, resistors, capacitors, switches, comparators, inverters, and logic gates (e.g., "AND", "NAND", "OR", "NOR").

The circuit is described in terms of a CMOS embodiment, wherein "P" (e.g., "P1") indicates a PMOS (P-channel) transistor and "N" (e.g., "N1") indicates an NMOS (N-channel) transistor. CMOS transistors are of the FET (field effect transistor) type, each having three "nodes" or "terminals"—namely, a "source" (S), a "drain" (D), and a "gate" (G) controlling the flow of current between the source and the drain. In the description that follows, it will be evident that a number of the PMOS and NMOS transistors are "diode-connected", meaning that their drain (D) is connected to their gate (G). The general theory of operation of transistors, particularly CMOS transistors, is well-known to those having ordinary skill in the art to which the present invention most nearly pertains.

As will evident from the description that follows, a number of the CMOS transistors are connected in a "current-mirroring" configuration. The concept of current-mirroring is well known, and in its simplest form comprises two similar polarity transistors (e.g., two PMOS transistors) having their gates connected with one another, and one of the pair of transistors being diode-connected. Current-mirroring generally involves causing a current to flow through the diode-connected transistor, which results in a gate voltage on the diode-connected transistor required to produce that current. Generally, the gate voltage of the diode-connected transistor is forced to become whatever voltage is necessary to produce the mirrored current through that transistor. Since the diode-connected transistor, by definition, has no gate current, by applying the gate voltage of the diode-connected transistor to any other identically-connected transistor, a mirrored-current will flow through the identically-connected transistor. Typically, the current-mirroring transistors all have the same physical area, in which case the mirrored current will be essentially same as the current which is being mirrored. It is also known to produce a mirrored current which is either greater than or less than the current being mirrored by making one of the transistors physically larger or smaller (in area) than the other. When such identically-connected transistors having different areas are connected in a current-mirroring configuration, their scaled (larger or smaller) areas will produce correspondingly scaled (larger or smaller) currents.

In the main hereinafter, the numerous connections between the various components of the circuit are clearly illustrated in the figure, and the descriptive emphasis is on the various functions of and interactions between the various components of the circuit rather than on reciting (ad nauseam) each and every individual connection between the various components, all of which are explicitly illustrated in the figure.

The antenna system 210 comprises a coil antenna 212 and a capacitor 214 connected across the antenna 212 to form an L-C resonant tank circuit providing an alternating current (AC) output to a full-wave rectifier circuit 302.

The full-wave rectifier circuit 302 comprises two PMOS transistors and two diodes, connected in a conventional manner, as shown, and outputs a full wave rectified direct current (DC) voltage on a line 303. A capacitor 304 is connected between the line 303 and ground to "smooth out" (filter) variations ("ripple") in the full wave rectified DC voltage on the line 303. The voltage on the line 303 thus becomes a usable voltage for the remaining components of the transponder—in this case, a positive supply voltage (Vcc) on the line 303.

A temperature-sensing circuit 306, corresponding approximately to the base-emitter voltage-to-current converter 250 of FIG. 2, is connected between the line 303 (Vcc) and ground, and includes four CMOS transistors labeled P1, P2, N1 and N2 and a lateral bipolar transistor labeled Q1, and is connected to the external resistor 216 (Rext). The transistors P2 and N1 are diode-connected, as illustrated. The two transistors P1 and P2 are connected in a current-mirroring configuration, and the two transistors N1 and N2 are also connected in what can generally be considered to be a current-mirroring configuration. The source of the transistor N1 is connected via the transistor Q1 to ground, and the source of the transistor N2 is connected via a the external resistor (Rext) 216 to ground.

As will become evident, the ability of the temperature-sensing circuit 306 to produce a signal (i.e., a current) that is proportional to a sensed (ambient) temperature (e.g., within the tire with which the transponder is associated) is flargely dependent on the characteristic that the base-emitter voltage of the transistor Q1 is a highly predictable and repeatable function of temperature. The resistor (Rext) 216 is an external, precision, reference resistor, whose value is substantially independent of temperature (as contrasted with the temperature dependency of the transistor Q1). A suitable value for the resistor (Rext) 216 is 20.5 k$\Omega$.

The transistor N2 is connected between the transistor P2 and the external resistor 216 (Rext) in a "source-follower" mode. As a voltage is impressed on the gate of the transistor N2, its source voltage will "follow" its gate voltage (minus an inherent voltage drop (Vgs) between its gate and its source).

As current flows through the transistor N1, its gate voltage will be offset by its gate-source voltage drop (Vgs) above the emitter voltage at the transistor Q1. Since the transistors N1 and N2 are essentially identical, with the same current flowing through each of the two transistors N1 and N2, they will have identical gate-source voltage drops (Vgs). As a result, the voltage at the source of the transistor N2 across the external resistor 216 (Rext) will be essentially identical to the voltage at the emitter of the transistor Q1. Hence, applying Ohm's law (E=IR, or I=E/R), the current through the external resistor 216 (Rext) will equal the emitter voltage of the transistor Q1 divided by the resistance of the external resistor 216 (Rext).

In normal operation, all of the current flowing through the external resistor (Rext) 216 flows through the source of the transistor N2 and, consequently, through the diode-connected transistor P2. By a current-mirroring connection, the current through the transistor P2 is replicated (mirrored) in the transistor P1 and is further replicated (mirrored) in the transistor P4. This ensures that the current flowing through the transistors N1 and N2 will be the same, at all times, which further helps to ensure that the emitter voltage at the transistor Q1 and the voltage across the external resistor (Rext) 216 are identical, independent of voltage and process variations. As mentioned hereinabove, the transistors N1 and N2 are connected in what can generally be considered to be a current-mirroring configuration. However, since they are not strictly identically connected, their function in the circuit 306 is principally for "matching" Q1 and Rext.

In essence, the circuit 306 ensures that the current I(T) flowing through the external resistor (Rext) is predictable, and is a function of the absolute temperature (T) of the transistor Q1. As described in greater detail hereinbelow, this temperature-dependent current I(T) flowing through the external resistor (Rext) 216 is mirrored to a relaxation oscillator (312, described hereinbelow) to provide a signal indicative of the temperature of the transistor Q1 to the external reader (106, FIG. 1). As described in greater detail hereinbelow, the output frequency (Fosc) of the relaxation oscillator 312 will be a function of the absolute temperature (T) of the transistor Q1.

At this point, it is useful to note that it is essentially the transistor Q1 that is being employed as the temperature-sensing element of the overall transponder circuit. The transponder circuit advantageously employs an inherent characteristic of such a transistor implemented in CMOS technology that the base-emitter voltage of the transistor Q1 will vary by a predictable amount of –2.2 mv/° C. (millivolts per degree Celsius).

It should be noted that the transponder of the present invention is described in terms of a "passive" device, relying on RF energy being supplied to it by an external source (106, FIG. 1) to power up its circuitry. However, it is within the scope of this invention that the transponder contain its own power supply, such as in the form of a battery. In either case, when first powering up circuitry such as described with respect to the temperature-sensing circuit 306, it is important to ensure that they "ramp up" to their normal operating state from their quiescent state in a reliable and predictable (controlled) manner. To this end, two lines 305 and 307 are illustrated which are connected between the temperature-sensing circuit 306 and a "startup" circuit 308.

The startup circuit 308 is connected between the supply voltage (Vcc) on the line 303 and ground, and serves two main purposes: (i) to get current flowing in the temperature-sensing circuit 306 when the transponder (200) first starts up from a powered down state; and (ii) to mirror and convert the current flowing through the transistor P2 from a supply-referenced current to a ground-referenced current.

Startup is initiated by the transistor P3. The transistor P3 is fabricated to have high channel resistance so as to function in a "weak pull-up" mode. With its gate connected to ground, it will always be "on", and will behave essentially like a resistor having a fairly high resistance (e.g., >10 k ohms).

Since, at startup, no current flows elsewhere in the circuit, the transistor P3 operates to pull the gate of the transistor N3 towards the supply voltage (Vcc), thereby turning the transistor N3 "on", which effectively connects the transistor's N3 source to its drain which, in turn, causes current to flow through the diode-connected transistor P2 of the temperature-sensing 306 into the drain of the transistor N3. This causes the voltage at the source of the transistor P2 to decrease, thereby causing current to flow in the transistors P1 and P4. As current flows through the transistor P4 into the diode-connected transistor N5, a current-mirroring connection between the transistors N4 and N5 causes a corresponding current to flow through the transistor N4, thereby pulling the gate of transistor N3 to ground, thereby effectively shutting "off" the flow of current through the transistor N3.

However, with current now flowing through the current-mirrored transistors P1, P2 and P4, current flowing from the transistor P1 through the transistor N1 into the transistor Q1 forces the temperature-sensing circuit 306 to "start up" in its stable operating point state (rather than its zero current state). After startup, the transistor N3 essentially "drops out" of the circuit, having performed its intended function.

The transistor N5 is connected in a current-mirroring configuration with the transistor N4 (and, as described hereinbelow, with the transistor N6). Therefore, essentially, with a current equivalent to the current through the external resistor (Rext) 216 flowing through the transistor N5, the same current flows through the transistor N4, thereby establishing a reference voltage (Nbias) on the line 309. The reference voltage (Nbias) on the line 309, as well as a supply voltage (Vdd) on a line 309', are provided to a current-scaling circuit 310.

The supply voltage (Vdd) on the line 309' is provided in any suitable manner, such as a multiple of a bandgap voltage (Vbg) generated in a conventional manner elsewhere on the chip, and its magnitude (e.g., 1.32 volts) should be independent of temperature, such as inherent to the silicon process which is employed in making the chip. The provision of such a stable (e.g., bandgap) voltage (e.g., Vbg) and the supply voltage (e.g., Vdd) derived therefrom is well within the purview of one having ordinary skill in the art to which the present invention most nearly pertains, and is described in greater detail hereinbelow with respect to FIG. 3B.

The current-scaling circuit 310 is constructed in the following exemplary manner. The sources of the transistors P5 and P6 are connected to supply voltage Vdd. The gate of a transistor N6 receives the reference voltage (Nbias) on the line 309. The transistor Ng is connected in a current-mirroring configuration with the transistor N5 (as well as with the aforementioned transistor N4) and will therefore mirror the flow of current I(T) through the transistors N4 and N5. Consequently, the flow of current through the diode-connected transistor P5 will mirror the flow of current through the transistors N4, N5 and N6.

The transistors P5 and P6 are connected in a current-mirroring configuration, but are fabricated (using conventional CMOS fabrication techniques) such that current flowing through the transistor P6 is scaled up or down by a ratio (N) of the physical area of the transistor P5 to the physical area of the transistor P6. For example, if the transistor P6 is smaller in size than the transistor P5 (i.e, the transistor P5 is "N" times larger in area than the transistor P6), then the current flowing through the transistor P6 will be commensurately (N times) smaller than the current flowing through the transistor P5. Thus, the "scaled" current flowing through the transistor P6, is labeled "I(T)/N" in the figure, and is provided on a line 311 to a relaxation oscillator circuit 312. It is well known that the ratio of the currents between the transistors P5 and P6 can readily be established by conventional circuit processing techniques, such as by simply making one of the transistors larger than the other, or by implementing a one of the two transistors as the aggregate of two or more same-size transistors so that their aggregate area is larger than the area of the other of the two transistors.

The relaxation oscillator circuit 312 is of fairly conventional design, and includes two pair of transistors at the "front end" of each of its two phase paths—a pair of complementary transistors P7 and N7 at the front end of a one phase path (φ1) 314a, and another pair of complementary transistors P8 and N8 at the front end of another phase path (φ2) 314b.

Connected as illustrated, for a given pair of transistors (e.g., P7 and N7), when with their common gate voltage is high (i.e., towards positive supply) their output will be grounded, and when their common gate voltage is low they will provide the current I(T)/N flowing on the line 311 to a respective one of the phase paths (e.g., 314a) of the relaxation oscillator 312. As is known, in such an arrangement, when the common gate voltage of a one of the pairs of transistors (e.g., P7 and N7) is high, the common gate voltage of the other of the pairs of transistors (e.g., P8 and N8) will be low, and vice-versa. In this manner, each phase path 314a and 314b has a duty cycle (i.e., its "on" time), which may be the same as or may be different than the duty cycle of the other phase path 314b and 314a, respectively. Thus, each pair of transistors (e.g., P7 and N7) may be considered to be an "input switch" to its respective phase path (e.g., 314a).

Each phase path 314a and 314b of the relaxation oscillator 312 has a comparator 316a and 316b, respectively, at its input, and has a fixed-value capacitor $C_{FX1}$ and $C_{FX2}$, respectively, connected between the negative (−) input of the comparators 316a and 316b and ground. The capacitors $C_{FX1}$ and $C_{FX2}$ have exemplary capacitance values of 2–5 pf (picofarads) and 2–5 pf, respectively, and are preferably implemented as "on-chip" devices, such as poly-to-poly capacitors exhibiting a low temperature coefficient (e.g., less than 20 ppm). The positive (+) inputs (terminals) of the comparators 316a and 316b are tied together and are set to a reference threshold voltage Vbg, such as 1.32 volts, which is independent of temperature.

A "NOR" logic gate 318a and 318b is connected at the output of each phase path 314a and 314b, respectively, and the two NOR gates 318a and 318b are cross-connected to form a latching circuit having an output on a line 319. The cross-connected NOR gates 318a and 318b are thus capable of functioning as a flip flop, or an RS (re-set/set) latch.

When the common gate voltage of one of the input switches (e.g., P7 and N7) is high, the respective capacitor (e.g., $C_{FX1}$) for that phase path (e.g., 314a) is grounded (shorted out, caused to be devoid of charge). Conversely, when the common gate voltage of one of the input switches (e.g., P7 and N7) is high, the scaled current I(T)/N is applied to (allowed to flow into) the respective capacitor (e.g., $C_{FX1}$) for that phase path (e.g., 314a), and the capacitor and it begins to charge (acquire an increasing voltage across the capacitor). When the voltage across the capacitor reaches the comparator reference voltage (e.g., 1.32 volts) the output of the comparator goes low and changes the state of the output of the latch 318a/318b on the line 319. In this manner, the relaxation oscillator will oscillate at a frequency (Fosc) determined by the rise time of the capacitors $C_{FX1}$ and $C_{FX2}$ and, importantly, by the scaled current I(T)/N being supplied to the capacitors $C_{FX1}$ and $C_{FX2}$. With greater current I(T)/N being supplied, the voltages of the capacitors $C_{FX1}$ and $C_{FX2}$ will rise faster, crossing the threshold voltage faster, and causing the relaxation oscillator 312 to oscillate faster, thereby increasing the frequency of the signal Fosc on the line 319. The signal Fosc on the line 319 is inverted by an inverter 320, as shown, to provide a signal Fosc' on the line 321.

As described in greater detail hereinbelow, the oscillator 312 is controlled to run in two mutually-exclusive modes, a temperature-sensing mode (between times t0 and t1) and a pressure-sensing mode (between times t1 and t2), as controlled by the timing generator/sequencer 226. The frequency of the oscillator output signal Fosc (and of Fosc') will be different in each of these two modes.

Generating Temperature and Pressure Signals

In the exemplary context of the transponder 200 being associated with a pneumatic tire, it is principally desirable to determine the pressure within the pneumatic tire. For example, a typical passenger vehicle tire may be properly inflated at about 32 psi (about 221 ks).

It is, for example, estimated that an approximate 10% decrease in fuel consumption could be realized if the pneumatic tires on vehicles were operated at their specified pressure. Although vehicle fleet operators are typically sensitive to this issue, and check and adjust tire pressure frequently, the average operator of a passenger vehicle is often less inclined to keep an eye on their tire pressure until, for example, the tire is visibly flattened out. In such cases, an LCD (liquid crystal display) readout or the like on the dashboard of a car could provide dynamic tire inflation information to the operator of a vehicle, the pneumatic tires of which are equipped with a transponder such as the one described herein. Of no less significance is the emergence of "run-flat" tires being marketed by various tire manufacturers. The Goodyear EMT (extended mobility tire) series of tires is an example of a run-flat tire, an overall purpose of which is to allow a driver to travel up to 50 miles (=120 kilometers) on a deflated tire, at "reasonable" operating speeds (e.g., 60 miles per hour, or 144 kilometers per hour), while maintaining normal control over the vehicle. Such run-flat tires are generally well known, and do not form a portion of the present invention, per se. When running flat on a run-flat tire, it is particularly important that the driver be alerted to the fact that he or she is operating the vehicle on "borrowed time" as indicated, principally, by an indication, whether visual or audio (e.g., a beep) that the tire is indeed flat and needs to be repaired or replaced at his or her earliest convenience.

By allowing the relaxation oscillator 312 to run, the frequency of its output signal Fosc (and Fosc') will be a function of the absolute temperature of (sensed by) the transistor Q1. This is true in both the temperature-sensing mode and the pressure-sensing mode of operation.

In the temperature-sensing mode, and in the case that the capacitance values for $C_{FX1}$ and $C_{FX2}$ are equal, which is preferred, the relaxation oscillator 312 will have a symmetrical (balanced, 50%) duty cycle. In the pressure-sensing mode, the pressure-sensing capacitor ($C_P$) 218 is switched by a semiconductor switch 350 across $C_{FX2}$, which changes the duty cycle and output frequency Fosc (and Fosc') of the relaxation oscillator.

In the temperature-sensing mode, only the fixed capacitors $C_{FX1}$ and $C_{FX2}$ are being alternately charged (and discharged) resulting in a 50% duty cycle with a period proportional to ambient temperature. In the pressure-sensing mode, the pressure-sensing capacitor ($C_P$) 218 is switched into phase path 314b of the oscillator 312. Thus, for a given temperature, for the first half of the oscillator period the phase path 314a behaves in the same manner as in the temperature-sensing mode, and for the second half of the oscillator period the phase path 314b behaves in a manner that is proportional to the capacitance value of the fixed capacitor $C_{FX2}$ plus the capacitance value of the pressure-sensing capacitor ($C_P$) 218. This, in effect, slows down the oscillator and changes its duty cycle. The change in the duty cycle is indicative of the ratio of $C_P$ to $C_{FX2}$. Thus, from the ratio of the two periods (with and without $C_P$ in the circuit, it is straightforward to calculate what the additional capacitance $C_P$ is, hence the sensed pressure. As described in greater detail hereinbelow, the temperature-dependency of the oscillator output in the pressure-sensing mode can be completely eliminated, in a straightforward manner.

The "slowing down" of the oscillator when the pressure-sensing capacitor ($C_P$) 218 is switched into the oscillator circuit results, inevitably, in there being relatively fewer oscillator output pulses (reduced output frequency) to count during a given pressure-measurement window (e.g., $W_P$) than during a similar-duration temperature-measurement window (e.g., $W_T$). In other words, a "slowed-down" oscillator will reduce that rate at which counts indicative of the parameter measurement are collected. In order to increase the resolution (quantity) of the counts ($N_P$) generated during the pressure-measurement window ($W_P$), it is contemplated that the pressure-measurement window ($W_P$) can be increased in size (changed in duration) so as to allow for the capture of an appropriate number of pressure counts in the pressure register 234. This can readily be accomplished simply by establishing a larger (than otherwise) value for the time t2 which establishes the end of the pressure-measurement window ($W_P$) in the pressure-sensing mode (between times t1 and t2), as controlled by the timing generator/sequencer 226. For example, the temperature-measurement window $W_T$ (between times t0 and t1) can be on the order of several ones (e.g., eight) of milliseconds, and the pressure-measurement window $W_P$ can be on the order of tens or dozens (e.g., forty) of milliseconds. Alternatively, it is contemplated that the scaled current (I(T)/N) flowing out of the current-scaling circuit 310 to the relaxation oscillator 312 could be increased during the pressure-measurement window ($W_P$) to increase the fundamental frequency of the relaxation oscillator 312, thereby increasing the overall resolution of the pressure count. This can readily be accomplished, for example in the case of P6 being smaller in size (area) than the transistor PS, simply by switching in a transistor P6' (not shown) in lieu of the transistor P6, the transistor P6' having a larger area than the transistor P6 so that the ratio of the areas of the transistors P5 and P6 is closer to unity (i.e., less scaled down) and the current to the relaxation oscillator 312, hence its counting rate, is increased. Such switching in of another transistor P6' is readily effected with a switch (not shown) comparable to the aforementioned switch 350 which switches in the pressure-sensing capacitor ($C_P$) 218. One having ordinary skill in the art to which the present invention most nearly pertains will readily understand how to offset the "slowing down" of the oscillator when the pressure-sensing capacitor ($C_P$) 218 is switched into the oscillator circuit, in light of the teachings presented herein.

Measuring Parameters

When the transponder is powered up, temperature and pressure are continuously measured, and these measurements are transmitted back to the external reader/interrogator (106) as data words in a data stream. For example, each of the temperature and pressure parameters can be transmitted back to the reader/interrogator (106) as 12-bit data words as selected (known) portions of a larger (e.g., 144-bit) data stream. One bit in the overall data stream may be dedicated to the state (e.g., "closed" or "open") of the MTMS switch (220). A complete description of an exemplary data stream being transmitted by the transponder to the external reader/interrogator is set forth hereinbelow with reference to FIG. 3C.

Temperature is suitably measured by counting the number of cycles output from the oscillator 312 during a fixed time period (window of time from t0 to t1)) with a period $T_W$. For example, a down-counter (associated with the temperature register (232)) may be clocked by the oscillator, such that at the end of the window $W_T$, a temperature count $N_T$ is generated. The relationship between $N_T$ and temperature is linear.

Optimizing Pressure-Responsiveness

Obtaining (and displaying) an accurate pressure reading being of paramount importance when monitoring the pressure of a pneumatic tire, certain parameters of the transponder circuit may be established to maximize its pressure-responsiveness and therefore improve the accuracy of the pressure reading displayed by the external reader/interrogator (106).

As described hereinabove, the transponder responds to the changing capacitance of the pressure sensor ($C_P$) 218 by changing the value of a binary 12-bit word that is transmitted to the external reader/interrogator (106). This binary word is the count of an oscillator frequency during a timing window $W_P$ (between t1 and t2) established by the timing generator/sequencer 226. The pressure response can therefore be described as the change in counts per unit change in capacitance of the pressure-sensing capacitor ($C_P$) 218.

Pressure-responsiveness of the transponder has been found to be dependent on a number of factors, each of which can be analyzed. For example, it has been determined that:

(a) increasing the scaled current I(T)/N to the oscillator 312 will proportionally increase the pressure counts $N_P$ for a given value of the pressure-sensing capacitor ($C_P$) 218; and (b) decreasing the values for $C_{FX1}$ and $C_{FX2}$ will proportionally increase the pressure counts $N_P$ for a given value of the pressure-sensing capacitor ($C_P$) 218; and (c) increasing the current I(T)/N to the oscillator will proportionally increase the pressure counts $N_P$ (for a given value of $C_P$) at a greater rate than decreasing the values for $C_{FX1}$ and $C_{FX2}$.

As a general proposition, increasing the pressure counts $N_P$ is desirable. However, one having ordinary skill in the art to which the present invention most nearly pertains will readily appreciate that there is a practical upper limit to increasing the pressure counts at a frequency which may become unacceptably large for the capability of certain circuits of the IC chip.

Obtaining a Pressure Reading at the Reader/Interrogator

The fundamental frequency of the oscillator 312 is set by parameters in the IC chip (e.g., 204) and, as described hereinabove, is temperature-dependent. Therefore, the pressure-response is a function (hybrid) of both temperature and pressure, and the relationship of $N_P$ to $C_P$ is nonlinear. Therefore, using a linear equation for calculating the pressure response would inevitably lead to significant errors over a range of pressures being measured. (For limited ranges of pressures being measured, for example over a 20 psi (138 kp) range of pressures, using a linear equation may, however, be acceptable.)

An important advantage of using the transponder circuitry described hereinabove is that the relationship between $N_T/N_P$ to pressure sensor capacitance is linear, and requires no temperature compensation term in the equation (algorithm) used by the reader/interrogator (106) to calculate pressure, thereby greatly simplifying the design of the reader/interrogator. This beneficial "ratiometric" relationship is readily demonstrated by the following equations:

$$N_T = T_W * I(t)/(2*Vbg*C_{FX}) \qquad \text{(eqn. 1)}$$

$$N_P = T_W * I(t)/(Vbg*(2*C_{FX}+C_P)) \qquad \text{(eqn. 2)}$$

solving for $N_T/N_P$, the following is arrived at:

$$N_T/N_P = 1 + (C_P/2*C_{Fx}) \qquad \text{(eqn. 3)}$$

It can thus be observed that the ratio $N_T/N_P$ is only a function of $C_P$ and $C_{FX}$, and no other variables. This means that $N_T/N_P$ is only a function of pressure, and is insensitive to temperature or charging current variations.

FIG. 3A illustrates the components involved in the final step of capturing temperature and pressure measurements in the transponder. The signal Fosc' output by the relaxation oscillator 312 is provided to an input of each of two AND gates 360 and 362. A signal ("Capture Temp") is provided by the timing generator/sequencer 226 to the other input of the AND gate 360 during the temperature-sensing window ($W_T$) so as to load the temperature register/counter 232 with the count (data) $N_T$ indicative of measured temperature. Another data signal ("Capture Press") is provided by the timing generator/sequencer 226 to the other input of the AND gate 362 during the pressure-sensing window ($W_P$) so as to load the pressure register/counter 234 with the count (data) $N_P$ indicative of measured pressure. These signals are then shifted out of the registers 232 and 234, via the MUX 240, to the modulation circuit 246 described hereinabove.

Generating Reliable Supply and Reference Voltages

As described hereinabove, the positive (+) inputs (terminals) of the comparators 316a and 316b are tied together and are set to a reference "bandgap" voltage Vbg, such as 1.32 volts, which is independent of temperature. As also mentioned hereinabove, the supply voltage (Vdd) on the line 309' may be provided as a multiple of the reference bandgap voltage (Vbg) so as to be a stable operating voltage for the current steering circuit 310 and the relaxation oscillator 312.

FIG. 3B illustrates a circuit 370 suitable for generating supply voltage Vdd. A temperature-independent calculable bandgap voltage Vbg is readily derived, based on the processing techniques employed in fabricating the IC chip, as being inherent to the selected process (e.g., CMOS). This bandgap voltage Vbg is provided to the "+" input of an operational amplifier 372, connected as shown, in a feedback loop having gain, to provide supply voltage Vdd as an integral multiple of the bandgap voltage Vbg.

An Exemplary Data Stream

As mentioned hereinabove, information (data) from the transponder is transmitted to the external reader/interrogator in the form of a data stream, a portion of which is the temperature count $N_T$, another portion of which is the pressure count $N_P$, and another portion of which represents the state (e.g., "closed" or "open") of the MTMS switch (220). Remaining portions of the data stream may contain information which is personalized to a given transponder unit such as its ID information (e.g., serial number), calibration constants, and the like.

FIG. 3C illustrates an exemplary architecture for information which is stored (in memory) within the transponder, as well as a data stream which is transmitted by the transponder to the external reader/interrogator. The memory of the transponder core 204 has, for example, a 144-bit address space which includes 119 (one hundred nineteen) bits of programmable memory and one address location dedicated to the state of the MTMS switch 220, these 120 (one hundred twenty) bits of programmable memory constituting the EEPROM (136), plus the two 12-bit registers 232 and 234.

Each of the 119 programmable memory bits can separately be written to with any combination of data, including synchronization (sync) pattern information, general data, error checking codes, and temperature and pressure calibration data. The EEPROM is 'block writeable', meaning that in the 'write' mode, the entire 120 bits of EEPROM are programmed to a logical (binary) value of "1". Individual bits can be 'erased', or set to a logical value of "0" simply by clocking the chip to its physical address and placing the chip into the 'erase' mode. The address location is preserved.

In this example, the first twelve data locations (000 . . . 011) in ROW 1 are reserved for sync. The next seventy one data locations (012 . . . 082) in ROWs 2 through 7 are for general information and a value for a data validation algorithm such as CRC (Cyclic Redundancy Check). The next data location (083) contains the logic level (state) of the MTMS switch 220. A logical value of "1"0 indicates that the MTMS switch is open and a logical value of "0" indicates that the MTMS switch is closed.

The transponder unit is suitably calibrated prior to its installation in a tire. This basically involves determining slope and intercepts for temperature and pressure values generated by the transponder at various temperatures and pressures in a test chamber, and programming these characteristic calibration values associated with the transponder into the memory space. The next twelve data locations (084 . . . 095) in ROW 8 hold temperature calibration (e.g., intercept) data ("TEMP COMP"). The next twelve data locations (096 . . . 107) in ROW 9 hold pressure calibration (e.g., intercept) data ("PRESS COMP"). The next twelve data locations (108 . . . 113 and 114 . . . 119) in ROW 10 hold calibration slope information for temperature and pressure, respectively.

According to an aspect of the invention, it has been determined that characteristic values for the slope of the $N_T/N_P$, or "ratioed" response of temperature count divided by pressure count, is linear with respect to the value of the pressure-sensing capacitor $C_P$. Additionally, it has been determined that the ratioed value of $N_T/N_P$ is less sensitive to variations in coupling between the reader/interrogator and the transponder than either of these measurements taken alone. Thus, by determining (during calibration) and storing calibration data for the ratioed value of $N_T/N_P$ in the transponder, the ability to determine a true pressure reading which is relatively insensitive to coupling variations between the reader/interrogator and the transponder is both simplified and made more reliable. This ratioed calibration value for $N_T/N_P$ is stored in the transponder memory and included in the data stream transmitted to the external reader/interrogator.

As counts $N_T$ and $N_P$ for temperature and pressure are generated, as described hereinabove, they are stored in ROWs 11 and 12 of the overall memory space, which correspond to the temperature and pressure registers 312 and 314, respectively. Various predetermined values can be stored to indicate overflow and short-circuit conditions.

Operating Frequencies and Modulation

The transponder of the present invention is not limited to any particular operating frequency. The choice of operating frequency will depend largely upon factors such as where the transponder is mounted, in relationship to the object it is monitoring, the location of the reader antenna (108), and relevant government regulations permitting (conversely, restricting) data transmissions of the type set forth herein in selected portions of the overall RF frequency spectrum.

An example of suitable operating frequencies for operating the transponder in the United States is 60 KHz to 490 KHz.

The transponder can be polled (and powered) by the reader/interrogator at an first "interrogation" frequency (Fi), and the data stream can be transmitted back to the reader/interrogator at a second "data carrier" frequency (Fc) which is, conveniently, a whole number multiple or fraction of the interrogating frequency. For example, Fc=Fi/2. Or, Fc=Fi/4. The frequency (Fc) at which the data stream is transmitted back to the reader/interrogator is independent of the data rate, which is established by the clock generator 224 and the baud rate generator 248. However, one having ordinary skill in the art to which the present invention most nearly pertains will recognize that the range of available baud rates will typically be significantly less than the interrogation frequency (Fi). The baud rate is preferably derived from the interrogation frequency (Fi) of the reader/interrogator, such as a whole number fraction thereof. For example, the baud rate may be set at Fi/32 (or, in the case of Fc=Fi/2, the baud rate can be set to Fc/16).

For example, the interrogation frequency (Fi) may be 125 KHz, and the data carrier (Fc) may be set to 62.5 KHz, or half of the interrogation frequency.

In another example, an interrogation frequency (Fi) of 13.56 MHz has been found to be suitable.

The data stream, such as the exemplary data stream described with respect to FIG. 3C is impressed by the modulator circuit 246 onto the antenna 212, and transmitted to the reader/interrogator. It is within the scope of this invention that any suitable modulation scheme be employed, including amplitude modulation (AM), frequency modulation (FM), frequency shift keying (FSK), and phase shift keying (PSK). However, phase shift keyed (PSK) is preferred. AM modulation is not particularly well-suited to digital transmission. Frequency modulation schemes such as FM or FSK may be somewhat problematic with regard to propagating the data-modulated transponder output signal through the medium of a pneumatic tire.

Obtaining a Temperature-Compensated Pressure Reading

FIG. 4 illustrates a relevant portion of a reader portion of a reader/interrogator 400. It should clearly be understood that the transponder of the present invention is suitable for use with virtually any suitably configured reader interrogator. The description that follows is limited to broad architectural functions that would be performed in the reader/interrogator. One having ordinary skill in the art to which the present invention most nearly pertains would be able, from the description set forth herein, to implement these functions in an otherwise "generic" reader/interrogator.

The data-modulated transponder output signal is received by the antenna 410 (compare 210) of the reader/interrogator 400 (compare 200). The received signal is de-modulated and de-coded in a de-modulator/decoder circuit 420 (DE-MOD/DECODE) so that the different portions of the data stream can be properly segregated from one another. The data relating to temperature and pressure calibration (TEMP COMP, PRESS COMP, TEMP/PRESS SLOPES), the temperature count ($N_T$) and the pressure count ($N_P$) are provided to an arithmetic logic unit 422 capable of generating a true, temperature-compensated pressure signal ("PRESSURE") on a line 423 to the display 412 (compare 112) as well as a calibrated temperature signal ("TEMPERATURE") on the line 423. This information can be displayed to the user either selectively or simultaneously with other relevant information such as the state of the MTMS switch 220, as well as data (DATA) relating to tire identification and the like.

While the invention has been described in combination with embodiments thereof, it is evident that many alternatives, modifications, and variations will be apparent to those skilled in the art in light of the foregoing description. Accordingly, the invention is intended to embrace all such alternatives, modifications and variations as fall within the broad scope of the appended claims.

What is claimed is:

1. A passive RF transponder, including:

an antenna;

a rectifier circuit connected to the antenna to provide electrical power from a RF signal received by the antenna to the other components of the transponder;

a modulator circuit, operatively connected to the antenna to form a RF signal output for the transponder by modulation of the RF signal received by the antenna;

a first parameter sensor for sensing a first parameter;

a second parameter sensor for sensing a second parameter;

a timing generator for generating a first timing window during which the first parameter is measured and a second timing window during which the second parameter is measured;

a first register for capturing first data indicative of the first parameter;

a second register for capturing second data indicative of the second parameter; and the modulator circuit impressing the first data as a first portion of a data stream on a signal output by the transponder, and impressing the second data as a second portion of the data stream on the signal output by the transponder; characterized by:

an oscillator outputting a signal having a first frequency which is indicative of the first parameter during the first timing window, and having a second frequency which is indicative of the second parameter during the second timing window; and a register/counter circuit which counts the oscillations of the oscillator signal during the first timing window to capture the first data in the first register, and which counts the oscillations of the oscillator signal during the second timing window to capture the second data in the second register.

2. A passive RF transponder, according to claim 1, wherein:

the first parameter is temperature, and the first data is a function of temperature; and the second parameter is pressure, and the second data is a function of both temperature and pressure; characterized in that:

a ratio of the first data divided by the second data is a function of pressure only.

3. A passive RF transponder according to claim 1, characterized in that:

the oscillator output signal's first and second frequencies are both proportional to temperature.

4. A passive RF transponder, according to claim 1, characterized in that:

the antenna is selected from the group consisting of coil, loop and dipole.

5. A passive RF transponder according to claim 1, wherein:

a third sensor provides data indicative of a third parameter; and the modulator circuit impresses the third parameter data on a third portion of the data stream on the signal output by the transponder; characterized in that:

the third sensor is an excessive temperature sensor; and the third parameter is an excessively high temperature condition.

6. A passive RF transponder, according to claim 1, characterized in that:

the time period of the first timing window and the time period of the second timing window are adjusted to different durations, thereby adjusting the resolution of the counts of one of the first and second data relative to the resolution of the counts of the other one of the first and second data.

7. A passive RF transponder according to claim 1, characterized in that:

a base emitter voltage to current converter circuit utilizes the first parameter sensor and outputs a current to the oscillator, wherein the current is proportional to the first parameter; and a frequency of the oscillator output signal is proportional to the current output by the first parameter sensor.

8. A passive RF transponder according to claim 1, characterized by:

a current-scaling circuit, connected between the first parameter sensor and the oscillator, for scaling a current output by the first parameter sensor by a factor of 1/N, and providing a scaled current to the oscillator.

9. A passive RF transponder according to claim 8, characterized in that the current-scaling circuit includes:

a current-mirror including two transistors having dissimilar areas, a one of the two transistors being "N" times larger in area than an other of the two transistors.

10. A passive RF transponder according to claim 1, characterized in that:

the oscillator includes a relaxation oscillator having a first phase path and a second phase path.

11. A passive RF transponder according to claim 10, further characterized by:

a first fixed-value capacitor disposed in the first phase path; and a second fixed-value capacitor disposed in the second phase path.

12. A passive RF transponder according to claim 10, further characterized in that:

the second parameter sensor is a variable-value capacitor which is switched into a one of the first and second phase paths, across a respective one of the first and second fixed value capacitors, during the second timing window.

13. A passive RF transponder according to claim 1, characterized in that:

the first parameter sensor, the oscillator, the timing generator, the first parameter register, the second parameter register, and the modulator circuit, are resident on a single integrated circuit (IC) chip.

14. Method of measuring at least two parameters associated with a monitored object and outputting a signal, including the steps of:

deriving electrical power from a received RF signal;

measuring a first of the at least two parameters associated with the monitored object;

measuring a second of the at least two parameters associated with the monitored object;

generating a first timing window during which the first parameter is measured and a second timing window during which the second parameter is measured;

capturing first data indicative of the first parameter during the first timing window;

capturing second data indicative of the second parameter during the second timing window;

modulating the received RF signal to form a RF output signal;

impressing the first data as a first portion of a data stream on the RF output signal;

impressing the second data as a second portion of the data stream on the RF output signal; characterized by:

generating an oscillating signal having a first frequency which is indicative of the first parameter during the first timing window, and having a second frequency which is indicative of the second parameter during the second timing window; and counting the oscillations of the oscillating signal during the first timing window to capture the first data, and counting the oscillations of the oscillating signal during the second timing window to capture the second data.

15. Method, according to claim 14, characterized by:

adjusting the time period of the first timing window and the time period of the second timing window to different durations, thereby adjusting the resolution of the counts of one of the first and second data relative to the resolution of the counts of the other one of the first and second data.

16. Method, according to claim 14, characterized by:

generating a current (I(T)) which is a function of one of the at least two parameters; and causing at least one of the first and second frequencies of the oscillating signal to be proportional to the magnitude of the current.

17. Method, according to claim 16, further characterized by:

scaling the current during a one of the first and second timing windows, thereby adjusting the resolution of the counts of one of the first and second data relative to the resolution of the counts of the other one of the first and second data.

18. Method, according to claim 16, wherein:

the first parameter is temperature, and the first data is a function of temperature; and the second parameter is pressure, and the second data is a function of both temperature and pressure; characterized in that:

a ratio of the first data divided by the second data is a function of pressure only.

19. Method, according to claim 18, further characterized by:

a third of the at least two parameters is an excessive temperature condition.

20. Method, according to claim 14, further including the steps of:

measuring a third of the at least two parameters associated with the monitored object;

capturing third data indicative of the third parameter; and impressing the third data on a third portion of the data stream on the signal; characterized in that:

the third parameter is an excessively high temperature condition.

\* \* \* \* \*